United States Patent
Evans

(10) Patent No.: US 7,431,894 B2
(45) Date of Patent: Oct. 7, 2008

(54) CATALYST WITHDRAWAL APPARATUS FOR REGULATING CATALYST INVENTORY IN A FLUID CATALYST CRACKING UNIT

(75) Inventor: Martin Evans, Tolland, CT (US)

(73) Assignee: Intercat Equipment, Inc., Manasquan, NJ (US)

( * ) Notice: Subject to any disclaimer, the term of this patent is extended or adjusted under 35 U.S.C. 154(b) by 546 days.

(21) Appl. No.: 11/184,125

(22) Filed: Jul. 19, 2005

(65) Prior Publication Data

US 2007/0020154 A1   Jan. 25, 2007

(51) Int. Cl.
F27B 15/08 (2006.01)
(52) U.S. Cl. .................. 422/147; 422/139; 422/144
(58) Field of Classification Search ............ 422/147, 422/144, 139; 141/67
See application file for complete search history.

(56) References Cited

U.S. PATENT DOCUMENTS

| | | | | |
|---|---|---|---|---|
| 4,082,513 | A * | 4/1978 | Andon et al. ............... | 406/124 |
| 4,769,127 | A | 9/1988 | Erickson et al. | |
| 4,840,726 | A * | 6/1989 | Wakefield, Jr. ............. | 208/152 |
| 4,888,156 | A * | 12/1989 | Johnson ..................... | 422/144 |
| 5,389,236 | A | 2/1995 | Bartholic et al. | |
| 5,464,591 | A * | 11/1995 | Bartholic .................... | 422/142 |
| 5,810,045 | A | 9/1998 | Evans | |
| 6,358,401 | B1 | 3/2002 | Evans | |
| 6,859,759 | B2 * | 2/2005 | Evans ......................... | 702/188 |
| 6,878,656 | B2 * | 4/2005 | Bartholic .................... | 502/64 |
| 6,974,559 | B2 * | 12/2005 | Evans ......................... | 422/110 |
| 7,050,944 | B2 * | 5/2006 | Evans ......................... | 702/188 |
| 2004/0099572 | A1 * | 5/2004 | Evans ......................... | 208/113 |
| 2004/0102929 | A1 | 5/2004 | Evans | |
| 2004/0117158 | A1 | 6/2004 | Evans | |

OTHER PUBLICATIONS

"IMS to Control Room", Dwg S-29, Sheet 1, Intercat, Savannah, Georgia, Nov. 26, 2001.
Everlasting Valve Company, www.everlastingvalveco.com, printed Feb. 6, 2003.
ADPI C-Engine, www.adpi.com/C-Engine.htm, printed Nov. 15, 2002.
PCT Search Report and Written Opinion for PCT Application No. PCT/US 06/27542 dated Sep. 5, 2007.

\* cited by examiner

*Primary Examiner*—N. Bhat

(57) ABSTRACT

A catalyst withdrawal apparatus and method for regulating catalyst inventory in a fluid catalytic cracking catalyst (FCC) unit is provided. In one embodiment, a catalyst withdrawal apparatus for removing catalyst from a FCC unit includes a pressure vessel having a metering device coupled to a fill port. A heat dissipater is located adjacent the metering device and is adapted to cool catalyst entering the pressure vessel. A sensor is coupled to the pressure vessel arranged to provide a metric indicative of catalyst entering the pressure vessel through the metering device. In another embodiment, a method for regulating catalyst inventory in a FCC unit includes the steps of determining a change of catalyst present in a FCC unit, withdrawing catalyst from the FCC unit into an isolatable storage vessel coupled to the FCC unit, measuring the amount of catalyst disposed in the storage vessel, and removing the measured catalyst from the storage vessel.

17 Claims, 4 Drawing Sheets

CATALYST WITHDRAWAL APPARATUS FOR REGULATING CATALYST INVENTORY IN A FLUID CATALYST CRACKING UNIT

BACKGROUND OF THE INVENTION

1. Field of the Invention

Embodiments of the invention generally relate to a catalyst withdrawal apparatus and method for regulating catalyst inventory in a fluid catalytic cracking catalyst unit.

2. Description of the Related Art

FIG. 1 is a simplified schematic of a conventional fluid catalytic cracking system 130. The fluid catalytic cracking system 130 generally includes a fluid catalytic cracking (FCC) unit 110 coupled to a catalyst injection system 100, a petroleum feed stock source 104, an exhaust system 114 and a distillation system 116. One or more catalysts from the catalyst injection system 100 and petroleum from the petroleum feed stock source 104 are delivered to the FCC unit 110. The petroleum and catalysts are reacted in the FCC unit 110 to produce a vapor that is collected and separated into various petrochemical products in the distillation system 116. The exhaust system 114 is coupled to the FCC unit 110 and is adapted to control and/or monitor the exhausted byproducts of the fluid cracking process.

The FCC unit 110 includes a regenerator 150 and a reactor 152. The reactor 152 primarily houses the catalytic cracking reaction of the petroleum feed stock and delivers the cracked product in vapor form to the distillation system 116. Spend catalyst from the cracking reaction is transfer from the reactor 152 to the regenerator 150 where the catalyst is rejuvenated by removing coke and other materials. The rejuvenated catalyst is reintroduced into the reactor 152 to continue the petroleum cracking process. By-products from the catalyst rejuvenation are exhausted from the regenerator 150 through an effluent stack of the exhaust system 114.

The FCC unit 110 includes a catalyst injection system 100 that maintains a continuous or semi continuous addition of fresh catalyst to the inventory circulating between the regenerator 150 and the reactor 152. The catalyst injection system 100 includes a main catalyst source 102 and one or more additive sources 106. The main catalyst source 102 and the additive source 106 are coupled to the FCC unit 110 by a process line 122. A fluid source, such as a blower or air compressor 108, is coupled to the process line 122 and provides pressurized fluid, such as air, that is utilized to carry the various powdered catalysts from the sources 102, 106 through the process line 122 and into the FCC unit 110.

One or more controllers 120 is/are utilized to control the amounts of catalysts and additives utilized in the FCC unit 110. Typically, different additives are provided to the FCC unit 110 to control the ratio of product types recovered in the distillation system 116 (i.e., for example, more LPG than gasoline) and to control the composition of emissions passing through the exhaust system 114, among other process control attributes. As the controller 120 is generally positioned proximate the catalyst sources 106, 102 and the FCC unit 110, the controller 120 is typically housed in an explosion-proof enclosure to prevent spark ignition of gases which may potentially exist on the exterior of the enclosure in a petroleum processing environment.

During processing, there is a dynamic balance of the total catalyst within the FCC unit. As discussed above, catalyst is periodically added utilizing a catalyst injection system. During the cracking process, some catalyst is lost through the distillation system 116, while some catalyst is lost through the effluent exiting the regenerator 150. The addition rate required to maintain a desired level of catalytic activity sometimes matches the loss rate through attrition, and in this case, there is no need for corrective measures.

If the amount of catalyst within the FCC unit diminishes over time, the performance and desired output of the FCC unit will diminish, and the FCC unit will become inoperable. Conversely, if the catalyst inventory in the FCC unit increases over time, the catalyst bed level within the regenerator reaches an upper operating limit, necessitating a small catalyst withdrawal to prevent unacceptably high catalyst emissions into the flue gas stream, or other process upsets.

Catalyst withdrawal systems are normally sized for the most demanding operating case, which is when the entire catalyst inventory is removed during a short period of time when the FCC unit is shut down. The periodic operational-type catalyst withdrawals for level control addressed by this invention can take place once a day, once a week, or once a month, depending on how quickly the catalyst inventory level is building. Because these sudden changes in regenerator bed level cause changes in the pressure balance of the FCC unit, they may result in changes in catalyst circulation rate, reactor temperature and/or regenerator temperature, and these upset the stability of the FCC unit operation. As these changes in the dynamic equilibrium force the FCC unit away from its operating limits, the desired product mix and/or effluent composition may not be obtained. As the FCC unit is a major profit center in most refineries, a great deal of time and investment made by refineries to ensure the FCC unit is always operating against its operating limits, thereby maximizing profitability. Anything that forces the operation of the FCC unit away from these limits reduces profitability and is a major detriment to the refiner. Thus, it would be highly desirable to stabilize the FCC operation by eliminating sudden catalyst withdrawals, thus maintaining the dynamic balance of catalyst in a FCC unit.

Therefore, there is a need for a catalyst withdrawal apparatus suitable for use with a fluid catalytic cracking catalyst unit.

SUMMARY OF THE INVENTION

A catalyst withdrawal apparatus and method for regulating catalyst inventory in a fluid catalytic cracking catalyst (FCC) unit is provided. In one embodiment, a catalyst withdrawal apparatus for removing catalyst from a FCC unit includes a pressure vessel having a metering device coupled to a fill port. A heat dissipater is located adjacent the metering device and is adapted to cool catalyst entering the pressure vessel. A sensor is coupled to the pressure vessel arranged to provide a metric indicative of catalyst entering the pressure vessel through the metering device.

In another embodiment, a fluid catalyst cracking system is provided that includes a FCC unit having a catalyst withdrawal apparatus coupled thereto and configured to meter catalyst removed from the FCCU.

In yet another embodiment, a method for regulating catalyst inventory in a FCC unit includes the steps of determining a change of catalyst present in a FCC unit, withdrawing catalyst from the FCC unit into an isolatable storage vessel coupled to the FCC unit, measuring the amount of catalyst disposed in the storage vessel, and removing the measured catalyst from the storage vessel.

DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings. It is to be noted, however, that the appended drawings illustrate only typical embodiments of this invention and are therefore not to be considered limiting of its scope, for the invention may admit to other equally effective embodiments.

To facilitate understanding, identical reference numerals have been used, wherever possible, to designate identical elements that are common to the figures. It is contemplated that features from any one embodiment may be beneficially incorporated in other embodiments without additional recitation.

DETAILED DESCRIPTION

The invention generally provides catalyst withdrawal apparatus suitable for use on a fluid catalyst cracking (FCC) unit and a method for regulating catalyst inventory in a FCC unit. Advantageously, the invention facilitates the removal of excess catalysts from the FCC unit with minimal process disruption.

Figure 1:
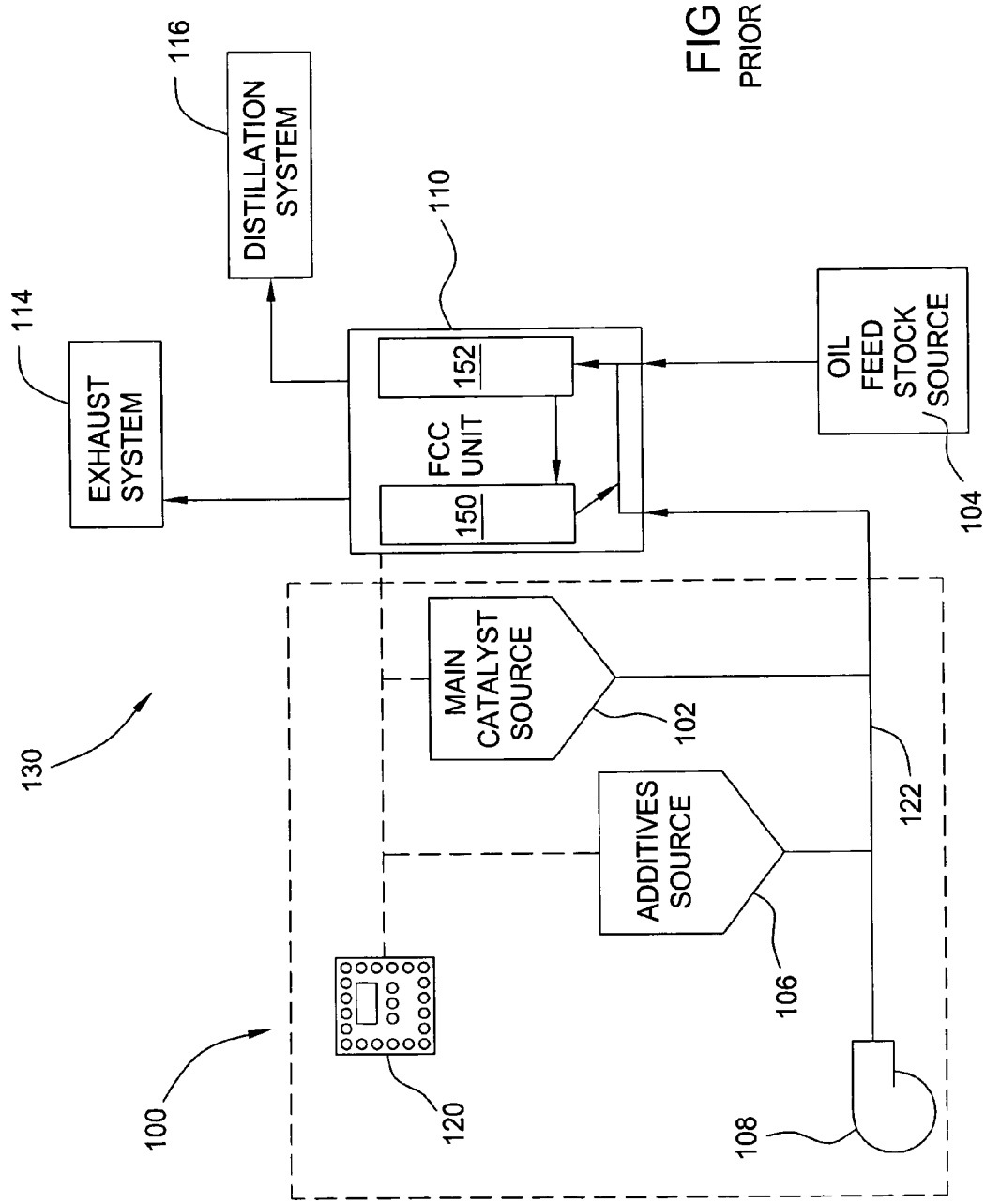
FIG. 1 is a simplified schematic view of a conventional fluid catalytic cracking system.
Figure 2:
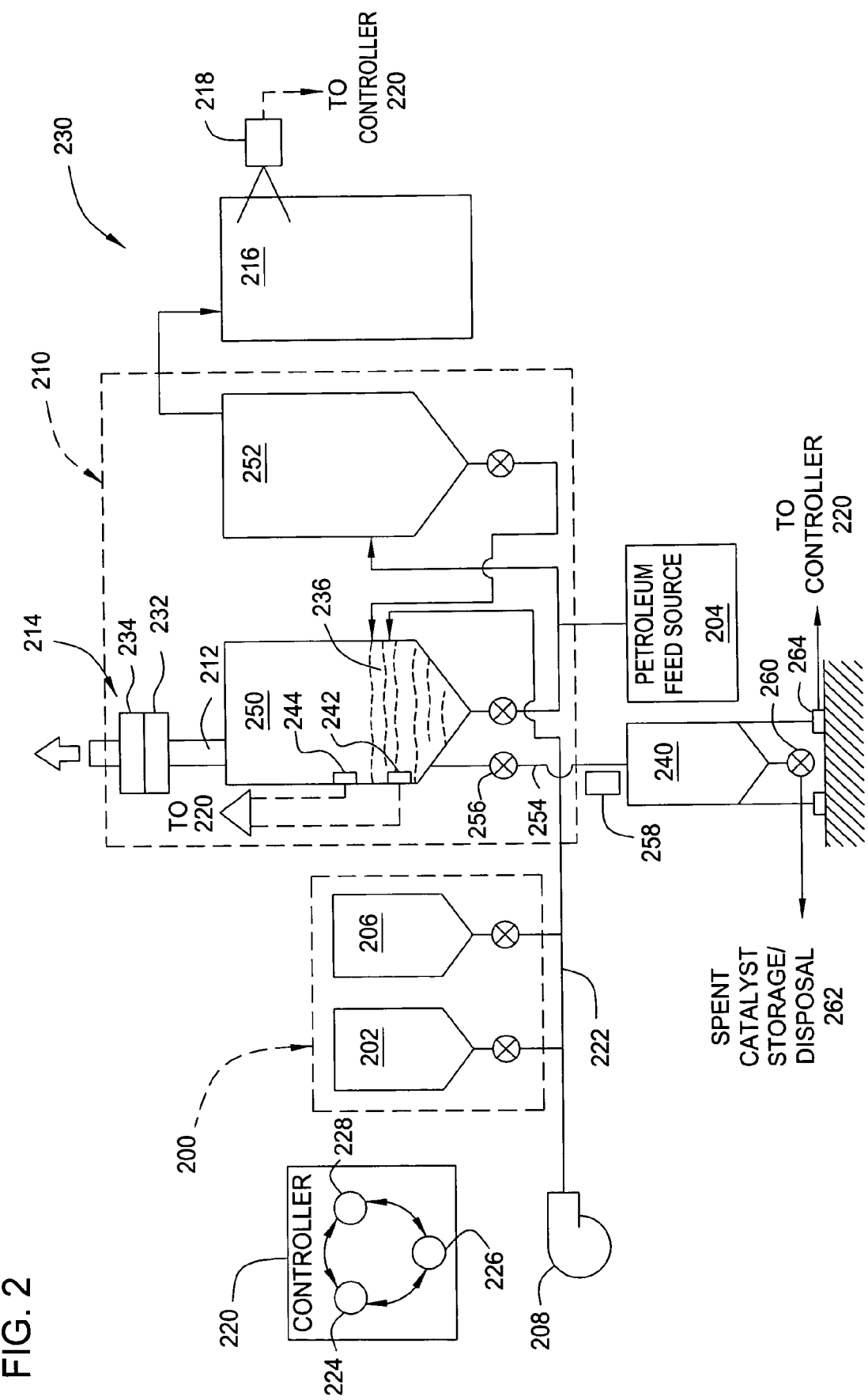
FIG. 2 is a simplified schematic diagram of a fluid catalytic cracking system having a catalyst withdrawal system in accordance with one embodiment of the present invention.

FIG. 2 is a simplified schematic of a fluid catalytic cracking system 230 having a metered catalyst withdrawal system 240. The fluid catalytic cracking system 230 generally includes a fluid catalytic cracking (FCC) unit 210 coupled to a catalyst injection system 200 and the metered catalyst withdrawal system 240, a controller 220, a petroleum feed stock source 204, an exhaust system 214 and a distillation system 216. One or more catalysts from the catalyst injection system 200 and petroleum from the petroleum feed stock source 204 are delivered to the FCC unit 210. The petroleum and catalysts are reacted in the FCC unit 210 to produce a vapor that is collected and separated into various petrochemical products in the distillation system 216.

The heaviest products recovered in the distillation system 216 are generally tested to determine the amount of entrained catalyst. In one embodiment, the testing may be carried out daily or once a shift in a refinery laboratory 218. It is contemplated the amount of entrained catalyst may be determined by other methods, such as, but not limited to some form of online analysis. The metric of entrained catalyst is provided from the laboratory 218 to the controller 220 for using in regulating the catalyst within the FCC unit as further described below.

The exhaust system 214 is interface with an exhaust 212 of the regenerator 250 and is adapted to monitor the composition of materials exhausted from the regenerator 250. In one embodiment, the exhaust system 214 is configured to detect a metric of catalyst exiting the regenerator 250 through the exhaust. This metric may be obtained by determining the amount of catalyst particles and/or catalyst fines entrained in the regenerator exhaust. As such, the exhaust system 214 may include a third or fourth stage separator, for example, a cyclone separator 232 and a scrubber 234. The metric of catalyst exiting the regenerator 250 can be provided to the controller 220 and utilized to balance the amount of catalyst within the FCC unit 210 as further described below.

The FCC unit 210 includes a regenerator 250 and a reactor 252 as known in the art. The reactor 252 primarily houses the catalytic cracking reaction of the petroleum feed stock and delivers the cracked product in vapor form to the distillation system 216. Spend catalyst from the cracking reaction is transferred from the reactor 252 to the regenerator 250, where the catalyst is rejuvenated by removing coke and other materials. The rejuvenated catalyst is reintroduced into the reactor 252 to continue the petroleum cracking process. By-products from the catalyst rejuvenation process are exhausted from the regenerator 250 through an effluent stack.

The FCC unit 210 includes a catalyst injection system 200 that maintains a semi continuous addition of fresh catalyst to the catalyst inventory circulating between the regenerator 250 and the reactor 252. The catalyst injection system 200 includes a main catalyst source 202 and one or more additive sources 206. The main catalyst source 202 and the additive source 206 are coupled to the FCC unit 210 by a process line 222. A fluid source, such as a blower or air compressor 208, is coupled to the process line 222 and provides pressurized fluid, such as air, that is utilized to carry the various powdered catalysts from the sources 202, 206 through the process line 222 and into the FCC unit 210.

Typically, different additives are provided from the addition source 206 to the FCC unit 210 to control the ratio of product types recovered in the distillation system 216 (i.e., for example, more LPG than gasoline) and to control the composition of emissions passing through the exhaust system 214, among other process control attributes. The main catalyst source 202 generally delivers a Y-zeolite containing catalyst, which drives the main cracking process. Examples of catalyst injection systems that may be adapted to benefit the invention are described in U.S. Pat. No. 5,389,236, issued Feb. 14, 1995; U.S. Pat. No. 6,358,401, issued Mar. 19, 2002; U.S. patent application Ser. No. 10/304,670 filed Nov. 2, 2002; U.S. Pat. No. 6,859,759 issued Feb. 22, 2005; U.S. patent application Ser. No. 10/445,543, filed May 27, 2003; and U.S. patent application Ser. No. 10/717,250, filed Nov. 19, 2003, all of which are hereby incorporated by reference in their entireties. Other suitable catalyst injection systems that may be adapted to benefit the invention are available from Intercat Equipment Corporation, located in Sea Girt, N.J.

The controller 220 is utilized to regulate the addition of catalysts and/or additives made by the injection system 200 and withdrawals made by the metered catalyst withdrawal system 240 so that the dynamic equilibrium of catalyst within the FCC unit 210 may be maintained. As the controller 220 is generally positioned proximate the catalyst sources 206, 202 and the FCC unit 210, the controller 220 is typically housed in an explosion-proof enclosure to prevent spark ignition of gases which may potentially exist on the exterior of the enclosure in a petroleum processing environment. The controller 220 may be equipped with remote access capability so that activity may be monitored from other locations, such as operations center or by catalyst suppliers. A controller having such capability is described in U.S. Pat. No. 6,859,759, issued Feb. 22, 2005 and U.S. patent application Ser. No. 10/304, 670, filed Nov. 26, 2002, both of which are hereby incorporated by reference in their entireties.

The regenerator 250 may be equipped with one or more sensors that provide a metric indicative of a catalyst level within the regenerator 250. In the embodiment depicted in FIG. 2, the regenerator 250 includes a first sensor 242 and a second sensor 244 configured to detect when the level of catalyst within the regenerator 250 exceeds an upper or lower threshold. The sensor 242, 244 may be an differential pressure measurement device, optical transducer, a capacitance device, a sonic transducer or other device suitable for providing information from which the level or volume of catalyst disposed in the regenerator 250 may be resolved. For example, if the first sensor 242 provides an indication to the controller 220 that the catalyst level is low, the controller 220 may initiate a catalyst injection by the catalyst injection system 200. If the second sensor 244 provides an indication to the controller 220 that the catalyst level is high, the controller 220 may initiate a catalyst withdrawal from the FCC unit by the catalyst withdrawal system 240, or speed up these otherwise semi-continuous withdrawal processes.

The metered catalyst withdrawal system 240 is coupled to the regenerator 250 by a conduit 254. A metering device 256 is disposed in the conduit 254 to control the flow of catalyst between the regenerator 250 and the metered withdrawal system 240. An outlet valve 260 is coupled to the catalyst withdrawal system 240 and is configured to control the flow of catalyst between the withdrawal system 240 and the spent catalyst storage/disposal 262. The metering device 256 and outlet valve 260 may be similarly constructed.

Figure 3:
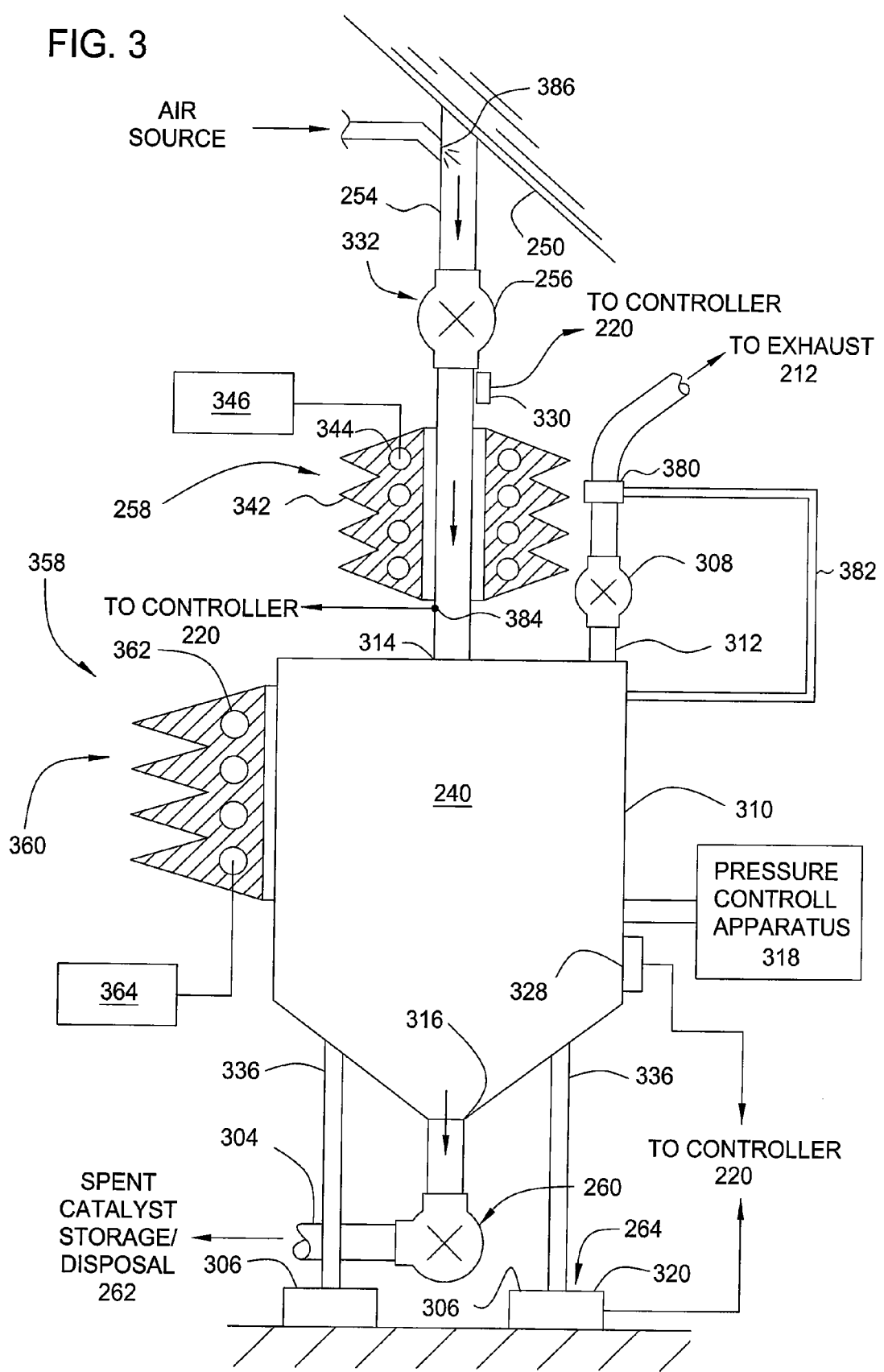
FIG. 3 is a sectional view of on embodiment of the catalyst withdrawal system of FIG. 2.

FIG. 3 depicts a larger view of one embodiment of the metered withdrawal system 240 of FIG. 2. The withdrawal system 240 includes a storage vessel 310 having the metering device 256 and the outlet valve 260 coupled thereto. The storage vessel 310 is typically a metal container suitable for use at high temperatures having a fill port 314 and a discharge port 316. Typically, the discharge port 316 is positioned at or near a bottom of the storage vessel 310. The storage vessel 310 is coupled to a pressure control apparatus 318 that controls the pressure within the storage vessel 310. The pressure control apparatus 318 generally pressurizes the storage vessel 310 to about 5 to about 60 pounds per square inch (about 0.35 to about 4.2 kg/cm$^2$) during withdrawal operations. The apparatus 318 may intermittently vent the storage vessel 310 to about atmospheric pressure to accommodate filling the vessel 310 with catalyst from the regenerator 250.

The storage vessel 310 is vented through a vent port 312 that is coupled to the regenerator's exhaust 212 or other suitable effluent stack. A control valve 308 is provided to regulate (or prevent) flow through the vent port 314 from the storage vessel 310. A cyclone 380 or similar device may also be inserted in the vent line to minimize catalyst carryover from the storage vessel 310. Recovered fines from the cyclone 380 may be transferred through a return conduit 382 to the storage vessel 310.

In one embodiment, the pressure control apparatus 318 is configured to provide air or other gas into the vessel 310. The air or other gas may be utilized to fluidize, aerate and/or otherwise cool the withdrawn catalyst disposed in the vessel 310. The pressure control apparatus 318 may additionally be configured to control the flow of the air or other gas provided to the vessel 310, thereby providing the ability to optimize cooling of the withdrawn catalyst and control environmental conditions within the storage vessel 310.

The metering device 256 is coupled to the fill port 314 to monitor to control the amount of catalyst received from the regenerator 250. The outlet valve 260 is coupled to the discharged port 316 to control the amount of withdrawn catalyst removed from the storage vessel 310 to the spent catalyst storage/disposal 262 through an outlet line 304. The metering device 256 may be an on/off valve such as an everlasting valve, a rotary valve or other device suitable for removing and/or regulating the amount of catalyst withdrawn from the FCC unit 210 into the storage vessel 310. The metering device 256 may determine the amount of catalyst by weight, volume, timed dispense or by other manners. Depending on the catalyst requirements of the system 230, the metering device 256 is typically configured to remove about 0.1 to about 30 tons per day of catalyst from the regenerator 250 without interruption of processing in the FCC unit 210. The metering device 256 typically removes catalysts from the FCC unit 210 periodically over the course of a planned production cycle, typically 24 hours, in multiple shots of predetermined amounts spaced over the production cycle. However, catalysts may also be removed from the FCC unit 210 in an "as needed" basis as discussed above.

In the embodiment depicted in FIG. 3, the metering device 256 is a control valve 332 that regulates the amount of catalyst delivered from the regenerator 250 into the storage vessel 310 by timed actuation. The control valve 332 may include shear disk (not shown) for opening and closing a valve orifice. In one embodiment, the shear disk rotates eccentricity while additionally rotating clear of the orifice to provide a self-lapping, seat cleaning action that prevents the withdrawn catalyst from grooving the sealing surfaces of the shear disk and valve seat that could cause the valve leakage. One valve that may be adapted to benefit from the invention is available from the Everlasting Valve Company, located in South Plainfield, N.J. Other control valves may alternatively be utilized.

Generally, the control valve 332 and the outlet valve 260 are interlocked to prevent simultaneous opening. This allows data to be obtained between valve 332, 260 openings such that the amount of catalyst entering and leaving the storage vessel 310 may be accurately resolved. In one embodiment, the outlet valve 260 is opened while the pressure regulating system 240 provides air at about 60 psi (about 4.2 kg/cm$^2$) into the interior of the storage vessel 310 to cause catalyst to flow from the storage vessel 310 through the valve 260 and into the spent catalyst storage/disposal 262 via the outlet line 304.

Referring back to FIG. 2, the metered withdrawal system 240 includes one or more sensors 264 for providing a metric suitable for resolving the amount of catalyst passing through the metering device 256 during each withdrawal of catalyst from the regenerator 250. The sensors 264 may be configured to detect the level (i.e., volume) of catalyst in the storage vessel 310, the weight of catalyst in the storage vessel 310 and/or the rate of catalyst movement through at least one of the storage vessel 310, the fill port 314, the discharge port 316, the metering device 256, the outlet valve 260, the conduit 254 or outlet line 304.

In the embodiment depicted in FIG. 3, the sensor 264 is a plurality of load cells 306 adapted to provide a metric indicative of the weight of catalyst in the storage vessel 310. The load cells 306 are respectively coupled to a plurality of legs 336 that supports the storage vessel 310 above a surface 320, such as a concrete pad. Each of the legs 336 has one load cell 320 coupled thereto. The controller 220 receives the outputs of the load cells 320 and utilizes sequential data samples obtained therefrom to resolve the net amount of withdrawn catalyst after each actuation of the metering device 256. Data samples are also taken after actuation of the outlet valve 260 such that the true amount of catalyst withdrawn from the FCC unit 210 through the system 240 may be accurately determined. Additionally, the net amount of catalyst withdrawn over the course of the production cycle may be monitored so that variations in the amount of catalyst dispensed in each individual shot may be compensated for by adjusting the delivery attributes of the metering device 256, for example, changing the open time of the control valve 332 to allow more (or less) catalyst to pass therethrough and be removed from the FCC unit 210.

Alternatively, the sensor 264 may be a level sensor 328 coupled to the storage vessel 310 and adapted to detect a metric indicative of the level of catalyst within the storage vessel 310. The level sensor 328 may be a differential pressure measuring device, an optical transducer, a capacitance device, a sonic transducer or other device suitable for providing information from which the level or volume of catalyst disposed in the storage vessel 310 may be resolved. By utilizing the sensed difference in the level of catalyst disposed in the storage vessel 310 after dispenses, the amount of catalyst removed from the regenerator 250 may be resolved for a known storage vessel geometry.

Alternatively, the sensor 264 may be a flow sensor 330 adapted to detect the flow of catalyst through one of the components of the catalyst withdrawal system 240. The flow sensor 330 maybe a contact or non-contact device and may be mounted to the storage vessel 310, the metering device 256 or the conduit 254 coupling the storage vessel 310 to the waste container. In the embodiment depicted in FIG. 3, the flow sensor 330 may be a sonic flow meter or capacitance device adapted to detect the rate of entrained particles (i.e., catalyst) moving through the delivery line 308.

Returning to FIG. 2, a heat dissipater 258 is coupled to or positioned approximate to the conduit 254. The heat dissipater 258 is configured to extract heat from the catalyst within conduit 254, thereby reducing the temperature of the catalyst flowing from the regenerator 250 to the metered withdrawal system 240.

Referring additionally to FIG. 3, the heat dissipater 258 may be positioned proximate the conduit 254 between the regenerator 250 and the metering device 256, or positioned proximate the conduit 254 between the metering device 256 and the storage vessel 310. In another embodiment, the conduit 254 may be coiled or define a torturous path such that the heat dissipater 258 may be interfaced with a greater length of conduit than if the conduit was routed in a straight line path as shown in FIG. 2, thereby improving the amount of heat transferred therebetween.

The heat dissipater 258 may include at least one or more temperature regulating features. For example, the heat dissipater 258 may include heat transfer fins 342. In another embodiment, the heat dissipater 258 may include one or more conduits 344 coupled to a fluid source 346 through which a heat transfer fluid is flowed. By reducing the temperature of catalyst being withdrawn from the regenerator 250, the design constraint of the withdrawal system 240 may be relaxed accordingly with the reduction in catalyst temperature entering the vessel 310.

Similarly, the storage vessel 310 may also be equipped with a thermal regulating device 358 to reduce the temperature of the storage vessel 310. The thermal regulating device 358 may be configured similar to the heat dissipater 258 described above. For example, the thermal regulating device 358 may include heat transfer fins 360. In another embodiment, the thermal regulating device 358 may include one or more conduits 362 coupled to a fluid source 364 through which a heat transfer fluid is flowed.

The storage vessel 310 may alternatively and/or additionally be cooled as described above by providing fluid from the pressure control apparatus 318 into the vessel 310. The control valve 308 may also be periodically opened to allow heated gases disposed on the interior volume of the vessel 310 to be removed and replace by cooler gas provided from the pressure control apparatus 318.

The temperature of the gas and/or catalyst entering vessel 310 may be monitored using a sensor 384. If the controller 220 determines, in response to a metric of temperature provided by the sensor 384, that the temperature of the gas and/or catalyst entering the vessel exceed a predefined limit, then a remedial action may be initiated. For example, remedial actions may include at least one of shutting off the flow through into the vessel 310 to allow the system to cool before restarting, reducing the flowrate of catalyst into vessel 310 using the regulating device 256, increasing the heat extraction rate of the heat dissipater 258 or adding an extra flow of cold air to the catalyst leaving the regenerator to cool it down through jets 386 formed in the conduit 254.

Returning to FIG. 2, the controller 220 is provided to control the function of at least the withdrawal system 240. The controller 220 may be any suitable logic device for controlling the operation of the catalyst withdrawal system 240. In one embodiment, the controller 220 is a programmable logic controller (PLC), such as those available from GE Fanuc. However, from the disclosure herein, those skilled in the art will realize that other controllers such as microcontrollers, microprocessors, programmable gate arrays, and application specific integrated circuits (ASICs) may be used to perform the controlling functions of the controller 220. It is contemplated that the injection system 200 and the withdrawal system 240 may have separate controllers, which may, or may not, be linked.

The controller 220 is coupled to various support circuits that provide various signals to the controller 220. These support circuits include, power supplies, clocks, input and output interface circuits and the like. Other support circuits couple to the temperature sensor 384, the sensors 264, the metering device 256, the outlet valve 260, the pressure control apparatus 318 and the like, to the controller 220.

Figure 4:
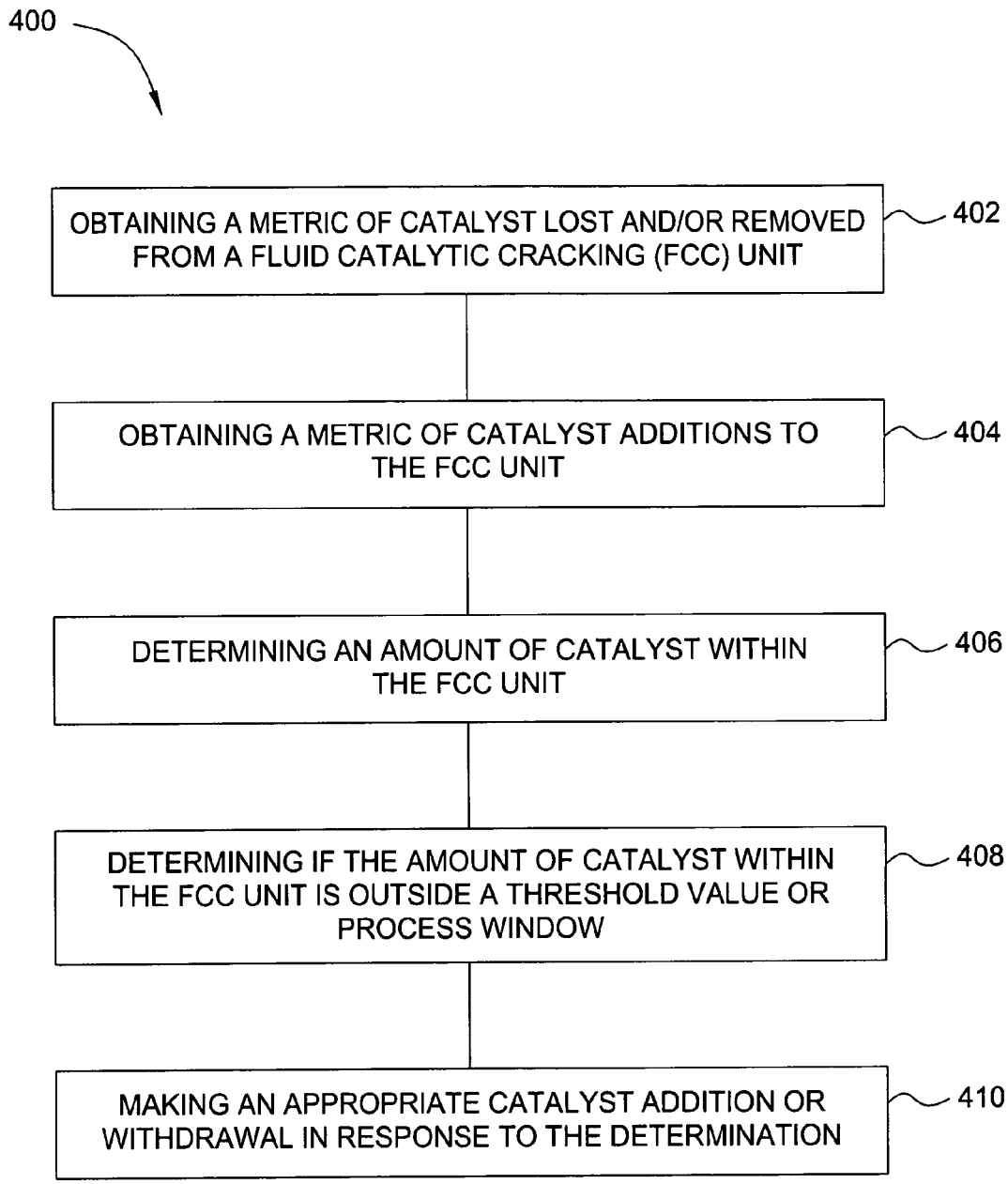
FIG. 4 is a flow diagram of one embodiment of a method of regulating catalyst in a fluid catalytic cracking system.

FIG. 4 is flow diagram of one embodiment of a method 400 for regulating catalyst within a FCC unit. The method 400 begins at step 402 by obtaining a metric of catalyst lost and/or removed from the FCC unit. The metric of catalyst lost may be a predefined value. For example, based on empirical data, or calculated data, or maybe a provided real time and/or as an updated metric. Examples of updated and/or provided metrics include a metric of catalyst entrained in the product stream at the distiller, catalyst exiting the regenerator through the exhaust system, catalyst removed from the metered withdrawal system, among others.

At step 404, a metric of catalyst additions are obtained. The metric of catalyst addition are typically attained from the catalyst addition system, in the form of catalyst and/or additives added to the FCC unit.

At step 406, an amount of catalyst within the FCC unit is determined. In one embodiment, the amount of catalyst is determined by summing the catalyst additions obtained at step 404 minus the catalyst removed from the system obtained at step 402. The determination of catalyst within the FCC unit may be made from data obtained over a predetermined period of time. The predetermined period of time may be in fractions of an hour, hourly, daily or over other time periods. The determination of catalyst within the FCC unit may be made from data obtained real time, for example, by monitoring a data stream such as regenerator bed level. As the process described above is iterative, the total catalyst determined may, alternatively, be calculated by subtracting the catalyst removed over the period from the last determination and adding the catalyst added over the same period.

At step 408, the catalyst amount is compared against a threshold value or process window. If the determined catalyst is outside of a predefined process window (or exceeds the threshold), appropriate catalyst additions or withdrawals are made at step 410. This cycle of monitoring the amount of catalyst is repeated in order to maintain the dynamic catalyst equilibrium in the FCC unit. Advantageously, this allows the FCC unit to continue operating at or near processing limits with minimal fluctuation, thereby providing the desired product mix and emissions composition with minimal dis-optimisation, thereby maximizing the profitability of the FCC system refiner.

In another embodiment of a method for regulating catalyst within a FCC unit, the withdrawal system 240 may be set to remove a predefined amount of catalyst over a predefined period of time. For example, the withdrawal system 240 may be set to remove a target withdrawal of about 4 tons of catalyst per day. The withdrawal may be made in predetermined increments, such that a total withdrawal amount will be made over the predefined period. In one embodiment the operator may manually initiate withdrawals from the regenerator 250 using the system 240. For example, the operator may initiate a withdrawal in response to the catalyst bed level within the regenerator 250, such as provided by information obtained by the sensor 244, The manual withdrawal may be made in addition to the target withdrawal, or count against the target withdrawal for that time period.

Although the teachings of the present invention have been shown and described in detail herein, those skilled in the art can readily devise other varied embodiments that still incorporate the teachings and do not depart from the scope and spirit of the invention.

What is claimed is:

1. A catalyst withdrawal apparatus for removing catalyst from a fluid catalyst cracking (FCCU) unit, comprising:
   a pressure vessel suitable for high temperature operation;
   a fill port and a discharge port defined in the pressure vessel;
   a metering device coupled to the fill port;
   a heat dissipater located adjacent the metering device and adapted to cool catalyst entering the pressure vessel; and
   a sensor coupled to the pressure vessel arranged to provide a metric indicative of catalyst entering the pressure vessel through the metering device.

2. The apparatus of claim 1, wherein the sensor further comprises:
   at least one of a load cell, a differential pressure sensor, flow sensor or a level sensor.

3. The apparatus of claim 1, wherein the heat dissipater further comprises:
   one or more heat transfer fins.

4. The apparatus of claim 1, wherein the heat dissipater further comprises:
   a conduit adapted to flow a heat transfer fluid therethrough.

5. The apparatus of claim 1, wherein the metering device further comprises:
   a valve coupled to the fill port.

6. The apparatus of claim 1 further comprising:
   a vent port adapted for coupling to an effluent stack or other safe location; and
   a pressure control apparatus coupled to the pressure vessel and suitable for establishing a pressure within the vessel in excess of 5 pounds per square inch.

7. The apparatus of claim 1 further comprising:
   a cooling system arranged to regulate a temperature of the pressure vessel.

8. The apparatus of claim 1, wherein the cooling system further comprises as least one of fins coupled to the pressure vessel or a cooling jacket.

9. A fluid catalyst cracking system comprising:
   a fluid catalyst cracking unit (FCCU) having a reactor coupled to a regenerator; and
   a catalyst withdrawal apparatus coupled to the FCCU and configured to meter catalysts removed from the FCCU.

10. The system of claim 9 further comprising:
    a heat dissipater disposed between the catalyst withdrawal apparatus and the reactor, the heat dissipater adapted to cool catalyst moving between the catalyst withdrawal apparatus and the reactor.

11. The system of claim 10, wherein the heat dissipater further comprises:
    one or more heat transfer fins.

12. The system of claim 10, wherein the heat dissipater further comprises:
    a conduit adapted to flow a heat transfer fluid therethrough.

13. The system of claim 9 further comprising:
    a metering device disposed between the catalyst withdrawal apparatus and the FCCU, the metering device adapted to regulate flow of catalyst moving between the catalyst withdrawal apparatus and the FCCU.

14. The system of claim 13, wherein the metering device further comprises:
    a valve coupled to the catalyst withdrawal apparatus and adapted to selectively open a passage defined between the catalyst withdrawal apparatus and the FCCU.

15. The system of claim 13 further comprising:
    a sensor arranged to provide a metric indicative of catalyst entering the catalyst withdrawal apparatus.

16. The system of claim 15, wherein the sensor further comprises:
    at least one of a load cell, a differential pressure sensor, a flow sensor or a level sensor.

17. The system of claim 9, wherein the catalyst withdrawal apparatus further comprises:
    a pressure vessel; and
    a vent port disposed in the pressure vessel and coupled to an effluent stack or other safe location.

* * * * *

UNITED STATES PATENT AND TRADEMARK OFFICE
CERTIFICATE OF CORRECTION

PATENT NO.       : 7,431,894 B2
APPLICATION NO.  : 11/184125
DATED            : October 7, 2008
INVENTOR(S)      : Martin Evans It is certified that error appears in the above-identified patent and that said Letters Patent is hereby corrected as shown below:

In claim 8, column 10, line 11, replace "fins" with --fin--.

Signed and Sealed this

Second Day of December, 2008

JON W. DUDAS
*Director of the United States Patent and Trademark Office*